United States Patent [19]
Suhara et al.

[11] Patent Number: 5,953,204
[45] Date of Patent: *Sep. 14, 1999

[54] ELECTRIC DOUBLE LAYER CAPACITOR

[75] Inventors: Manabu Suhara; Kazuya Hiratsuka; Takeshi Morimoto; Katsuji Ikeda, all of Yokohama, Japan

[73] Assignee: Asahi Glass Company Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/574,314

[22] Filed: Dec. 18, 1995

[30] Foreign Application Priority Data

Dec. 27, 1994 [JP] Japan ................................ 6-326109
Jun. 8, 1995 [JP] Japan ................................ 7-141815

[51] Int. Cl.⁶ .......................................... H01G 9/00
[52] U.S. Cl. ........................ 361/502; 361/505; 361/517; 361/535; 361/305
[58] Field of Search ........................... 361/502, 503, 361/504, 505, 517, 519, 535, 537, 522–527, 301.1, 303, 305, 311, 327; 29/25.01, 25.03, 25.41, 25.42

[56] References Cited

U.S. PATENT DOCUMENTS

| | | | |
|---|---|---|---|
| 4,020,240 | 4/1977 | Schaikjer | 429/50 |
| 4,352,866 | 10/1982 | Klinedinst et al. | 429/101 |
| 4,725,927 | 2/1988 | Morimoto et al. | |
| 4,824,745 | 4/1989 | Ogawa et al. | 429/213 |
| 4,862,328 | 8/1989 | Morimoto et al. | |
| 5,030,527 | 7/1991 | Carpio et al. | 429/192 |
| 5,494,762 | 2/1996 | Isoyama et al. | 429/194 |
| 5,636,437 | 6/1997 | Kaschmitter et al. | 29/825 |

FOREIGN PATENT DOCUMENTS

| | | |
|---|---|---|
| 58-225564 | 12/1983 | Japan . |
| 58-225566 | 12/1983 | Japan . |
| 62-94908 | of 1987 | Japan . |
| 64-014882 | of 1989 | Japan . |
| 64-14882 | 1/1989 | Japan . |
| 2-236955 | 9/1990 | Japan . |
| 3-203311 | 9/1991 | Japan . |
| 4-154106 | 5/1992 | Japan . |
| 4-267056 | 9/1992 | Japan . |
| 4-286108 | 10/1992 | Japan . |
| 6-236829 | 8/1994 | Japan . |
| 6-302472 | 10/1994 | Japan . |

*Primary Examiner*—Leo P. Picard
*Assistant Examiner*—Phuong T. Vu
*Attorney, Agent, or Firm*—Oblon, Spivak, McClelland, Maier & Neustadt, P.C.

[57] ABSTRACT

An electric double layer capacitor is provided that includes a positive electrode having a currect collector combined with a polarizable electrode material composed mainly of activated carbon, a negative electrode having a current collector of porous metal incapable of forming an alloy with lithium, combined with a carbonaceous material having lithium ions occluded by a chemical method or an electrochemical method to a carbon material capable of occluding and releasing a lithium ions, and a nonaqueous electrolyte containing a lithium salt. The negative electrode is supported on a current collector of porous metal having a thickness of 0.1 to 1 mm and a porosity of 5 to 80%.

13 Claims, 1 Drawing Sheet

ELECTRIC DOUBLE LAYER CAPACITOR

BACKGROUND OF THE INVENTION

1. Field of the Invention

The present invention relates to an electric double layer capacitor (hereinafter referred to as EDLC) which has a large energy density and is capable of rapidly charging or discharging and which is excellent in the charge-discharge cycle resistance.

2. Discussion of Background

Conventional EDLC includes a coin-shaped type wherein an element having a separator sandwiched between a pair of opposing electrodes each having a sheet-shaped polarizable electrode made mainly of activated carbon supported on a current collector, is sealed together with an electrolyte in a metal case comprising a metal cover and a metal casing, by means of an insulating gasket for insulating the cover and the casing, and a winding type wherein an element prepared by winding a pair of opposing sheet-shaped electrodes with a separator interposed therebetween, is accommodated together with an electrolyte in a metal casing and sealed so that the electrolyte will not evaporate from an opening of the casing.

On the other hand, Japanese Unexamined Patent Publications No. 154106/1992, No. 203311/1991 and No. 286108/1992 propose EDLC having an element incorporated which is prepared by laminating a number of electrodes and separators for the purpose of attaining a large capacity with large current. Namely, EDLC is disclosed wherein an element is prepared by laminating many rectangular polarizable electrodes and separators alternately so that separators are disposed between the electrodes, and a positive electrode lead and a negative electrode lead are connected to ends of the respective polarizable electrodes of the element by e.g. crimping. In such a state, the element is accommodated in a casing, an electrolyte is impregnated to the element, and the casing is sealed with a cover.

The electrodes constituting such EDLC are polarizable electrodes composed mainly of activated carbon having a large specific area, for both positive and negative electrodes. Further, in order to obtain a large discharge current, Japanese Unexamined Patent Publication No. 236829/1994 proposes the one in which porous nickel is used for current collectors for both electrodes composed mainly of activated carbon.

Japanese Unexamined Patent Publication No. 14882/1989 proposes a secondary cell wherein an electrode composed mainly of activated carbon is used as the positive electrode, and a composite having lithium ions occluded in a molded product of carbon material having a lattice spacing $d_{002}$ as measured by X-ray ray diffraction (hereinafter referred to as lattice spacing $d_{002}$) of from 0.338 to 0.356 nm, is used as the negative electrode.

With conventional EDLC wherein polarizable electrodes composed mainly of activated carbon are used for both electrodes, the working voltage per unit element is about 1.0 V in the case of EDLC with an aqueous electrolyte or about 2.5 V in the case of EDLC with a nonaqueous electrolyte, although it depends also on selection of the solvent and the solute to be combined. In order to obtain a larger quantity of electric energy (in order to obtain a higher energy density), EDLC having a higher working voltage is desired.

Further, EDLC or a cell wherein a polarizable electrode composed mainly of activated carbon is used as the positive electrode and a carbonaceous material having lithium or lithium ions occluded, is used for the negative electrode, is not suitable for rapid charging and discharging, since its internal resistance is substantial, and thus has a drawback that it lacks in charge-discharge cycle durability.

In order to increase the capacity of EDLC, an attempt to increase the capacity by means of activated carbon having a large specific surface area, has been made. However, the specific surface area of activated carbon is limited to about 3000 $m^2/g$ at the largest, and even if activated carbon having a larger specific surface area, is employed, the energy density can not be improved, since the pore volume of activated carbon is large. Thus, the capacity per unit weight of EDLC wherein activated carbon having a large specific surface area is employed, is restricted. However, in order to secure a longer backup type, a larger capacity is desired.

At present, coin-shaped EDLC of small size is frequently used for memory backup. Whereas, IC used to be operated at 5 V, and accordingly a working voltage exceeding 5 V used to be obtained by connecting two or more EDLCs in series. However, recently, IC can be operated at 3 V, and the memory backup can be conducted at 3 V. Accordingly, it has been desired to develop EDLC which has a working voltage exceeding 3 V with a single EDLC.

Further, EDLC capable of charging and discharging with a large current of at least 10 A is expected to be useful as a power source for an electric car or for temporary storage of its regenerative braking energy. Accordingly, it has been desired to develop EDLC which has a sufficiently high energy density and which is capable of rapid charging and discharging and excellent in the charge-discharge cycle durability.

SUMMARY OF THE INVENTION

The present invention has been made to accomplish the above object. Namely, the present invention provides EDLC comprising a positive electrode having a current collector combined with a polarizable electrode material composed mainly of activated carbon, a negative electrode having a current collector of porous metal incapable of forming an alloy with lithium, combined with a carbonaceous material having lithium ions occluded by a chemical method or an electrochemical method to a carbon material capable of occluding and releasing lithium ions, and a nonaqueous electrolyte containing a lithium salt.

DETAILED DESCRIPTION OF THE PREFERRED EMBODIMENTS

Figure 1:
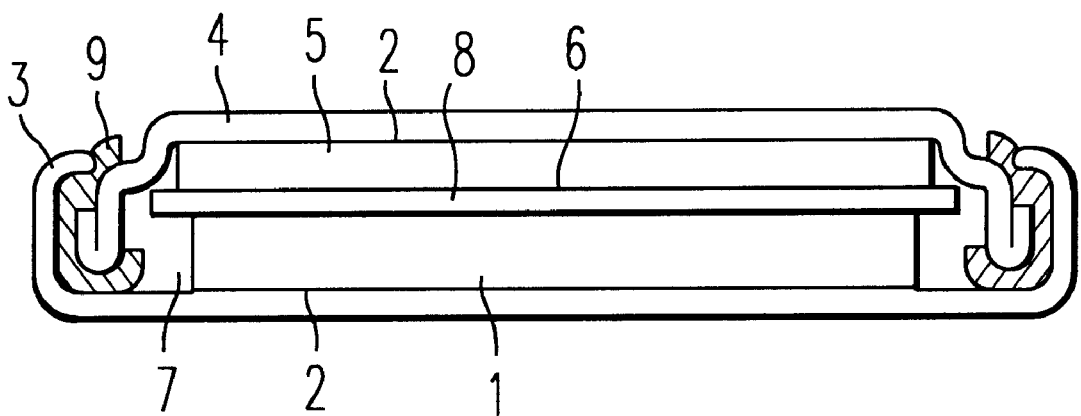
FIG. 1 is a cross-sectional view illustrating an embodiment of coin-shaped EDLC according to the present invention.

In EDLC of the present invention, two types of electrodes are used, which are different from each other in the types of ions to be adsorbed or occluded therein. Namely, an electrode composed mainly of a carbonaceous material having lithium ions occluded to a carbon material capable of occluding and releasing lithium ions, is capable of occluding lithium ions only, and this electrode is used as the negative electrode. On the other hand, a polarizable electrode composed mainly of activated carbon is capable of accumulating electric charge by forming an electric double layer on the activated carbon surface by anions, or in some cases by cations, and this polarizable electrode is used as the positive electrode.

In order for such positive and negative electrodes to provide their characteristics to the maximum of their ability, a nonaqueous solvent having a high decomposition voltage is used as the electrolyte for EDLC of the present invention. Further, the electrolyte material in this electrolyte is limited to a lithium salt wherein the cation is a lithium ion. Such a lithium salt may, for example, be $LiClO_4$, $LiCF_3SO_3$, $LiBF_4$, $LiPF_6$, $LiAsF_6$, $LiSbF_6$, $LiCF_3CO_2$ or $LiN(CF_3SO_2)_2$. Among them, $LiClO_4$, $LiBF_4$, $LiN(CF_3SO_2)_2$ and $LiPF_6$ are preferred, since their stability is high and their electroconductivity is good.

As the solvent for the nonaqueous electrolyte, a nonaqueous solvent comprising at least one member selected from the group consisting of propylenecarbonate, ethylenecarbonate, butylenecarbonate, γ-butyrolactone, dimethylsulfoxide, sulfolane, formamide, dimethylformamide, dioxolan, a phosphoric acid triester, maleic anhydride, succinic anhydride, phthalic anhydride, 1,3-propanesultone, propylenecarbonate derivatives, ethylenecarbonate derivatives, 4,5-dihydropyran derivatives, nitrobenzene, 1,3-dioxane, 1,4-dioxane, 3-methyl-2-oxazolidinone, 1,2-dimethoxyethane, tetrahydrofuran, tetrahydrofuran derivatives, sydnone derivatives, 2-methyltetrahydrofuran, dimethylcarbonate, diethylcarbonate, ethyl methyl carbonate, acetonitrile, nitromethane, an alkoxyethane, dimethylacetamide and toluene, can be used. Among them, a nonaqueous solvent comprising at least one member selected from the group consisting of propylenecarbonate, ethylenecarbonate, diethylcarbonate, ethyl methyl carbonate, dimethoxyethane, butylenecarbonate, sulfolane and dimethylcarbonate, is particularly preferred, since the chemical and electrochemical stability is high, and the electroconductivity and low temperature characteristics are good.

In EDLC of the present invention, the positive electrode made of a polarizable electrode material composed mainly of activated carbon contains, in addition to activated carbon, an electroconductive material to improve electron conductivity. The polarizable electrode for this purpose may be formed by various methods. For example, activated carbon is mixed with carbon black (conductive material) and a phenol resin, followed by press molding, sintering in an inert gas atmosphere and activating in a steam atmosphere, whereby a polarizable electrode composed solely of activated carbon and carbon black can be obtained. Then, this polarizable electrode is bonded to a current collector made of e.g. a stainless steel sheet by e.g. an electroconductive adhesive. In the case of coin-shaped EDLC, it is preferred to use a casing or a cover made of a stainless steel sheet as the current collector or the terminal. Another method may be mentioned in which an alcohol is added to activated carbon powder, carbon black (conductive material) and a binder, and the mixture is kneaded and molded into a sheet, followed by drying to obtain a polarizable electrode sheet, which is cut into a desired size and then bonded to a current collector by e.g an electroconductive adhesive, to obtain a positive electrode. As the binder, polytetrafluoroethylene is preferably employed. A still further method may be mentioned in which a solvent is mixed to activated carbon powder, carbon black and a binder to obtain a slurry, which is then coated on a metal foil as a current collector, and the coated layer is dried to obtain a positive electrode integral with the current collector. The current collector may be any electrochemically or chemically corrosion resistant conductive material. For the current collector for the positive electrode, a sheet or foil of e.g. stainless steel, aluminum, titanium or tantalum can be used. Among them, a sheet or foil of stainless steel or aluminum is preferred as a current collector from the viewpoint of both the performance and the price. Nickel is readily oxidizable, and if it is used as a current collector for the positive electrode, the working voltage of EDLC tends to be low. The polarizable electrode and the current collector are electrically bonded by e.g. an electroconductive adhesive, to form a positive electrode.

The activated carbon useful for the positive electrode includes, for example, coconut shell type activated carbon, phenol resin type activated carbon and petroleum coke type activated carbon. Among them, it is preferred to use phenol resin type activated carbon or petroleum coke type activated carbon, since it is thereby possible to obtain EDLC having a large capacity. A treating method for activation of such activated carbon includes, for example, a steam activation treating method and a molten potassium hydroxide activation treating method. Among such activation treating methods, it is particularly preferred to use activated carbon obtained by the molten potassium hydroxide treating method, since it is thereby possible to obtain EDLC having a large capacity.

The electroconductive material to be incorporated to the positive electrode may, for example, be carbon black, natural graphite, artificial graphite, metal fiber, titanium oxide or ruthenium oxide. However, it is preferred to use ketjenblack or acetylene black, which is a kind of carbon black and which is effective even when incorporated in a small amount. If the amount of the electroconductive material incorporated is too much, the capacity of the positive electrode decreases. In order to secure good electroconductivity and a large capacity simultaneously, the amount of the electroconductive material incorporated to the positive electrode is preferably within a range of from 3 to 50 wt %, more preferably from 5 to 30 wt %, in the total amount of the activated carbon and the electroconductive material. Further, the activated carbon preferably has an average particle size of at most 20 μm and a specific surface area of from 1000 to 3000 $m^2/g$, whereby the capacity of EDLC can be made large, and the internal resistance can be made low.

On the other hand, the negative electrode having a current collector combined with a carbonaceous material having lithium ions occluded to a carbon material capable of occluding and releasing lithium ions, may, for example, comprise a carbon material capable of occluding lithium ions, a binder and a current collector. In EDLC of the present invention, a porous metal is used as the current collector for the carbonaceous material of the negative electrode in an integrated form, whereby the internal resistance is minimized, and rapid charging and discharging by a large current are made possible. The material for the porous metal of the negative electrode may be any material so long as it does not form an alloy with lithium and it is stable under the condition for use on the negative electrode side. Preferably, nickel, copper or an alloy thereof having a porosity of from 80 to 99.5% is used.

In preferred EDLC of the present invention, the negative electrode is the one prepared by having a mixture of a binder and a carbon material capable of occluding and releasing lithium ions, supported on a current collector of porous metal having a porosity of more than 80%, particularly at least 90%, followed by compressing to bring the thickness to a level of from 0.1 to 1 mm and the porosity to a level of from 5 to 80%. In order to improve the performance of EDLC, it is very effective to control the porosity to a properly small level by compressing the negative electrode. The porosity is preferably from 5 to 80%. If the porosity is less than 5%, the electrolyte tends to hardly penetrate into the interior of the electrode, whereby a part of the electrode material in the interior of the negative electrode will not function. If the porosity exceeds 80%, the negative electrode tends to be bulky relative to the capacity. More preferably, the porosity is from 10 to 60%.

The thickness of the negative electrode is preferably from 0.1 to 1 mm, more preferably from 0.2 to 0.7 mm. The binder serves to bind particles of the electrode material to one another to maintain them so that the electrical contact among the particles of the electrode material will not loosen by the charge-discharge cycles. Especially when a porous metal is used as the current collector, the current collector of porous metal and the binder cooperate to maintain the electrode material so that the electrical contact among particles of the electrode material and between the particles of the electrode material and the current collector will not loosen.

In preferred EDLC of the present invention, the current collector to be used for the negative electrode is porous nickel having a porosity of from 80 to 99%, wherein the average number of pores traversed by a linear line of a length of 1 cm drawn in its cross section is at least 5. The porous metal is preferably in the form of a sheet having a thickness of from 0.3 to 3 mm, so that a negative electrode having a proper thickness and porosity can thereby be readily prepared. It is particularly preferred to use porous nickel having a porosity of from 90 to 99%, and an average number of pores traversed by a linear line of a length of 1 cm drawn on the cross section of the porous metal (hereinafter referred to as an average pore number) of at least 5.

To measure this average pore number, the porous metal is embedded in a resin, and the resin is cured, whereupon the average number of pores traversed by a linear line drawn on its cross section is counted, and the number thereby obtained is divided by the length of the linear line to obtain the average pore number. Porous nickel is stable under the condition of the negative electrode, and by accommodating the carbonaceous material in the pores, a good current-collecting property can be secured. More preferably, the negative electrode integrated with the porous nickel is compressed by e.g. a press to reduce excess voids in the negative electrode, so that a necessary and adequate amount of the electrolyte can be impregnated.

To prepare the negative electrode, preferably, a slurry prepared by adding a solvent to a carbon material, followed by kneading, is painted on a sponge sheet-form porous metal to impregnate the slurry into the pores, whereby the negative electrode material and the current collector are integrated. The porous metal is preferably the one having an average pore number of from 5 to 50, so that a good current-collecting property can be secured. Then, the sheet having the slurry injected, is dried and then compressed to adjust the porosity of the negative electrode. As the binder to be added to the slurry, it is preferred to employ any one of polyvinilidenefluoride, a fluoroolefin/olefin crosslinked copolymer, a fluoroolefin/vinyl ether crosslinked copolymer, carboxymethylcellulose, polyvinylpyrrolidone, polyvinyl alcohol and polyacrylic acid.

As the solvent for the slurry, it is preferred to employ a solvent which is capable of dissolving such a binder. The solvent is suitably selected for example from N-methylpyrrolidone, dimethylformamide, toluene, xylene, isophorone, methyl ethyl ketone, ethyl acetate, methyl acetate, dimethyl phthalate, ethanol, methanol, butanol and water. For crosslinking of the above crosslinked copolymer, amines, polyamines, polyisocyanates, bisphenols or peroxides may, for example, be used. Such a binder and a solvent may also be preferably employed for the preparation of a slurry of a polarizable electrode material for the positive electrode.

As the carbon material capable of occluding and releasing lithium ions as the main component of the carbonaceous material for the negative electrode, carbon materials with large capacities are preferably used which include a graphite type material such as natural graphite, artificial graphite, graphitized meso-carbon microbeads, graphite whiskers, graphitized carbon fibers or gas phase grown carbon fibers, an easily graphitizable carbon material obtained by heat treatment of coal coke, petroleum coke or pitch coke, a baked product of a furfuryl alcohol resin, a baked product of a novolak resin, or a baked product of a phenol resin. Among them, it is particularly preferred to use natural graphite, artificial graphite, graphitized meso-carbon microbeads, a baked product of a furfuryl alcohol resin, a baked product of a phenol resin, a baked product of a novolak resin, a heat treated product of petroleum coke, or a heat treated product of pitch coke, which has a large capacity for occluding and releasing lithium ions.

With respect to the natural graphite, it is preferred to use the one having the crystal structure developed and containing little impurities. Here, the natural graphite having a crystal structure developed is the one wherein the lattice spacing $d_{002}$ is less than 0.336 nm, and the mean crystallite size $L_c$ is at least 150 nm. The natural graphite having a crystal structure developed has a large ability to occlude and release lithium ions. Further, by using natural graphite containing little impurities, excellent charge-discharge cycle durability can be secured.

To reduce impurities in natural graphite, acid treatment with e.g. nitric acid, sulfuric acid or hydrofluoric acid may be carried out. It is preferred to use natural graphite having a carbon purity of at least 99 wt %, which is finally subjected to hydrofluoric acid treatment, since it is thereby possible to effectively remove an ash content.

With respect to artificial graphite, it is preferred to use the one having a crystal structure developed and containing little impurities. Here, the artificial graphite having a crystal structure developed is the one wherein the above $d_{002}$ is at most 0.3365 nm, and the above $L_c$ is at least 50 nm. It is possible to obtain artificial graphite having a high purity by selecting the starting material. It is preferred to employ artificial graphite having a carbon purity of at least 99.5 wt %.

With respect to graphitized meso-carbon microbeads, it is preferred to use the ones having a graphite crystal structure developed and containing little impurities, which were heat-treated at a high temperature of at least 2500° C. Here, the ones having a crystal structure developed mean that the above $d_{002}$ is at most 0.337 nm, and the above $L_c$ is at least 20 nm.

With respect to graphitized whiskers, it is preferred to use the ones having a crystal structure developed and containing little impurities. Here, the ones having a crystal structure developed mean that the above $d_{002}$ is at most 0.3365 nm, and the above $L_c$ is at least 10 nm.

With respect to graphitized carbon fibers, it is preferred to use the ones having a graphite crystal structure developed and containing little impurities, which were heat-treated at a temperature of at least 2500° C. Here, the ones having a crystal structure developed mean that the above $d_{002}$ is at most 0.3365 nm, and the above $L_c$ is at least 10 nm.

With respect to the baked product of a furfuryl alcohol resin, it is preferred to employ the one containing little impurities, obtained by heat treating a furfuryl alcohol resin at a temperature of from 1000 to 1500° C. It is preferred to use the one heat-treated so that the above $d_{002}$ is within a range of from 0.375 to 0.39 nm.

With respect to the baked product of a novolak resin, it is preferred to employ the one obtained by heat treatment of a novolak resin at a temperature of at most 700° C., wherein the H/C atomic ratio is from 0.25 to 0.28, and the above $d_{002}$ is at least 0.38 nm.

With respect to the baked product of a phenol resin, it is preferred to employ the one obtained by heat treatment of a phenol resin, wherein the above $d_{002}$ is from 0.365 to 0.290 nm.

As the carbon material which is easily graphitizable, carbon material obtained by heat treating cokes such as coal coke, petroleum coke or pitch coke, may be mentioned. Among them, it is preferred to use the one having a high carbon purity, or the one subjected to treatment for removing impurities to have a high carbon purity. When such coke is heat-treated at a temperature of from 800 to 1500° C., it turns into a carbon material capable of occluding lithium ions, wherein the lattice spacing $d_{002}$ is from 0.340 to 0.355 nm.

Among such carbon materials, it is particularly preferred to use a carbon material wherein the lattice spacing $d_{002}$ is from 0.365 to 0.390 nm, as the negative electrode, whereby the charge-discharge cycle durability of EDLC will be improved. Further, it is preferred to use a carbon material powder having an average particle size of at most 30 $\mu$m, for the negative electrode, whereby the capacity of EDLC can be increased, and the internal resistance can be reduced. However, a powder which is too fine, is bulky. Therefore, it is preferred to use a powder having an average particle size of at least 2 $\mu$m.

If the amount of the binder to be incorporated in the electrode is less than 1 wt %, the strength of the electrode tends to be low, and if it exceeds 20 wt %, the electric resistance of EDLC tends to increase, and the capacity tends to decrease. Therefore, it is preferably within a range of from 1 to 20 wt % in the total amount of the carbon material and the binder. More preferably, the amount of the binder is from 3 to 12 wt %, in consideration of the balance between the capacity and the strength.

To have lithium ions occluded to the carbon material capable of occluding and releasing lithium ions, the following methods may be adopted. Firstly, there is a chemical method in which powdery lithium is mixed with a powder of the carbon material capable of occluding and releasing lithium ions to obtain a mixture, which is molded into a molded product, then immersed in an electrolyte to ionize lithium, so that lithium ions will be taken into the carbon material capable of occluding or releasing lithium ions. There is another chemical method in which a molded product comprising a binder and a carbon material capable of occluding and releasing lithium ions, is immersed in an electrolyte in such a state that it is in contact with a lithium foil, so that lithium will be ionized and taken into the carbon material capable of occluding and releasing lithium ions. Further, there is an electrochemical method in which a molded product comprising a binder and a carbon material capable of occluding and releasing lithium ions, is placed on one side in an electrolyte of a nonaqueous solvent containing a lithium salt, and a lithium electrode sheet is placed on the other side, whereupon an electric current is conducted, so that lithium ions will be occluded in the carbon material. Among these methods, it is particularly preferred to employ the chemical method wherein a molded product comprising a binder and a carbon material capable of occluding and releasing lithium ions, is immersed in an electrolyte in such a state that it is in contact with a lithium foil to ionize lithium, so that lithium ions will be taken into the carbon material.

In another preferred EDLC of the present invention, the current collector combined to the positive electrode is made of a porous metal. By this construction, the internal resistance of the positive electrode of EDLC can be reduced in good balance with the internal resistance of the negative electrode. Accordingly, the internal resistance of entire EDLC can further be reduced, whereby rapid charging and discharging can be made possible. Further, the charge-discharge cycle durability will be improved simultaneously. The polarizable electrode material mainly of activated carbon for the positive electrode preferably contains a binder and an electroconductive material such as carbon black which improves the electroconductivity.

The positive electrode is prepared preferably in the following manner. Namely, a solvent is mixed to activated carbon powder, carbon black and a binder to form a slurry. Then, this slurry is painted to impregnate into a current collector of sheet-form porous metal, followed by drying to obtain a sheet-form electrode integral with the current collector. The sheet-form electrode is cut into a desired size and then electrically connected to a terminal or to a cover or casing of a metal case by bonding by means of an electroconductive adhesive or by welding such as electrical welding.

The material for the porous metal to be used for the current collector of the positive electrode may be any material so long as it is electrochemically and chemically corrosion resistant. As a preferred material for the porous metal, nickel, aluminum, titanium, tantalum or an alloy thereof, may be mentioned. When porous nickel is used for the current collector of the positive electrode, the working voltage tends to be slightly low. However, it is thereby possible to form a current collector having a fine porous structure, whereby an excellent current collector can be obtained, which is a preferred current collector readily available at a relatively low cost. A porous metal of aluminum, titanium or tantalum is a preferred current collector, since the working voltage is high. Especially, porous aluminum is a preferred current collector, since it is available at a low cost.

Porous nickel or porous aluminum accommodates a polarizable electrode material comprising activated carbon, an electroconductive material and a binder in its pores to impart a good current collecting property to the positive electrode and to reduce the internal resistance of the positive electrode. For example, a slurry of a polarizable electrode material is impregnated in the pores of a sponge sheet-shaped porous metal having a three dimensional structure, followed by drying, to obtain a positive electrode integrated with a current collector. In a case where impregnation is carried out by painting, an operation of impregnation and drying may be repeated until a predetermined amount of a polarizable electrode material is introduced. Another preferred method for filling a polarizabie electrode material in the pores, is an injection method whereby the process will be completed by a single operation. Namely, ethanol is added to activated carbon powder, an electroconductive material and polytetrafluoroethylene (hereinafter referred to as PTFE), followed by kneading and forming into a sheet. This sheet is placed on a sheet-form porous metal, or a sheet-form porous metal is sandwiched between such sheets, followed by pressing, to obtain a positive electrode, wherein the sheet-form porous metal and the polarizable electrode material are integrated. The thickness of the sheet for injection is preferably from 0.1 to 1.5 mm, more preferably from 0.15 to 1.0 mm.

Another preferred EDLC of the present invention has a positive electrode having a thickness of from 0.2 to 2.0 mm and a porosity of from 10 to 80%, prepared by integrating a polarizable electrode material comprising activated carbon, electroconductive carbon black and a binder and having a specific surface area of from 1000 to 3000 m$^2$/g, with a current collector of porous metal having a porosity of at least 80%, followed by compressing.

For the current collector of the positive electrode, it is preferred to use a sheet-form porous metal having a thickness of from 0.3 to 5 mm, so that the slurry can readily be impregnated, and a positive electrode having a proper thickness can readily be obtained. It is particularly preferred to use a porous metal having a porosity of from 85 to 99% and an average pore number of at least 5. As the porous metal, it is preferred to use the one having an average pore number of from 5 to 50 so that impregnation of the slurry is easy, and an excellent current collecting property can be obtained.

In another preferred EDLC of the present invention, the current collector to be used for the positive electrode is porous aluminum or porous nickel having a porosity of from 80 to 99% and an average pore number of at least 5. With an electrode integrated with a porous aluminum, aluminum may be thermal sprayed on the side not facing the other electrode, and it may be electrically connected to a cover or casing made of aluminum by welding. As a method for welding, it is particularly preferred to employ an electric welding method, whereby the process is simple and the electrical connection is certain, and it can be applied to both the positive electrode and the negative electrode.

The positive electrode integrated with the current collector of porous metal is preferably compressed by e.g. a roll to reduce the porosity and control the porosity of the positive electrode to a level which is adequate and sufficiently small. If the porosity of the positive electrode is adjusted to a properly small level, the internal resistance of EDLC can be reduced, and the energy density can further be improved. The porosity of the positive electrode is preferably from 10 to 80%. If the porosity is less than 10%, the nonaqueous electrolyte tends to hardly penetrate into the interior of the positive electrode, and the electrode in the interior will not work sufficiently. On the other hand, if the porosity of the positive electrode exceeds 80%, the positive electrode tends to be bulky, and the capacity per volume of the positive electrode will be small. The porosity of the positive electrode is more preferably from 15 to 60%. For the same reason, the thickness of the positive electrode is preferably from 0.1 to 3 mm, more preferably from 0.2 to 2 mm.

In another preferred EDLC of the present invention, the positive electrode, the negative electrode and the nonaqueous electrolyte are accommodated in a coin-shaped case made of a metal comprising a casing and a cover, wherein the positive electrode is disposed on the side of the casing or the cover made of a stainless steel sheet or a laminated sheet of aluminum and stainless steel, and the negative electrode is disposed on the side of the cover or the casing made of a stainless steel sheet, a nickel sheet, a copper sheet or a laminated sheet comprising at least two members selected from the group consisting of stainless steel, nickel and copper.

In coin-shaped EDLC, it is preferred that an electrode having a carbon material or a polarizable material integrated with a porous metal, is electrically connected to a cover or casing made of a stainless steel sheet, a nickel sheet or an aluminum sheet by an electroconductive adhesive or by welding. If the case of coin-shaped EDLC has such a structure, the cover and casing of the coin-shaped case will function as a stable terminal for a long period of time, whereby the electrical connection with the current collector is certain, and the product will provide a stable performance.

In another preferred EDLC of the present invention, the ratio of bv/3.6 d is within a range of from 0.05 to 0.90, where b is a single electrode capacity (unit: F) of the polarizable positive electrode, d is a lithium ion releasing capacity (unit: mAh) of the negative electrode, and v is the potential difference (unit: V) of the working voltage range. The value of this ratio bv/3.6 d is influential over the rapid charging and discharging characteristics and the charge-discharge cycle durability. Accordingly, the value of this ratio is preferably set within the above range. Here, the single electrode capacity b of the electrode is determined from a voltage drop gradient when a pair of electrodes of the same construction are disposed to face each other with a separator interposed therebetween in an electrolyte, a direct current voltage is applied and then discharged at a constant current.

The working voltage range of EDLC of the present invention can be set, for example, from 2.0 to 3.3 V, from 2.0 to 4.0 V, or from 3.3 to 4.5 V. The working voltage range is selected preferably within a range where deterioration of EDLC is little. The capacity C can be calculated by C=3.6× Q/(V$_1$−V$_2$), where V$_1$ is the upper limit of the working voltage range, V$_2$ is the lower limit of the working voltage range, and Q is the electric quantity (unit: mAh) taken out within this working voltage range. Further, the energy density E$_d$ of EDLC can be calculated by E$_d$=C(V$_1$$^2$−V$_2$$^2$)/2T, where T is the volume of EDLC (T may be the volume inclusive of a case or the volume of only the element having a separator sandwiched with a pair of electrodes).

The quantity d of lithium ions releasable from the negative electrode corresponds to the integrated electric quantity (mAh) when the negative electrode having lithium ions occluded to a carbon material by a chemical method or by an electrochemical method, is discharged or released at a current density of 1 mA/cm$^2$ to +1.0 V by the Li$^+$/Li electrode based potential. Therefore, the ratio bv/3.6 d varies depending upon the working voltage range of the EDLC to be set, even if the construction of EDLC is the same.

If the ratio bv/3.6 d is less than 0.05, the energy density of EDLC tends to be small. On the other hand, if the ratio bv/3.6 d exceeds 0.90, the rapid charging and discharging tends to be difficult, whereby the charge-discharge cycle durability will be low, although the initial energy density may be high. Taking the energy density and the rapid charging and discharging characteristics and the charge-discharge cycle durability into consideration, the ratio bv/3.6 d is preferably from 0.1 to 0.8. In the present invention, the internal resistance of EDLC is obtained from the voltage drop immediately after initiation of the discharge when it is subjected to a constant current discharge at a current density of 10 mA/cm$^2$.

Now, the present invention will be described in further detail with reference to Examples. However, it should be understood that the present invention is by no means restricted by such specific Examples.

EXAMPLE 1

A positive electrode was prepared as follows. Namely, ethanol (hereinafter referred to as Et) was added to a mixture comprising 80 wt % of molten potassium hydroxide activation treated petroleum coke type activated carbon powder (specific surface area: 2000 m$^2$/g, average particle size: 5 μm, hereinafter referred to as activated carbon A), 10 wt % of ketjenblack EC (electroconductive carbon black manufactured by Mitsubishi Chemical Corporation, hereinafter referred to as KB) and 10 wt % of PTFE, followed by kneading and rolling to obtain a sheet having a width of 10 cm, a length of 10 cm and a thickness of 0.5 mm, which was dried at 200° C. for 2 hours. This sheet was punched into a disk having a diameter of 12.5 mm to obtain a polarizable electrode. In the coin-shaped EDLC shown in FIG. 1, such a polarizable electrode 1 was bonded to the inside of a stainless steel 316L casing 3 by a graphite type electroconductive adhesive (hereinafter referred to simply as an electroconductive adhesive) to form a positive electrode. The single electrode capacity b of this positive electrode was 3.66 F, i.e. the capacity per 2 V was 2.0 mAh.

Then, a negative electrode was prepared as follows. Namely, three times by weight of N-methylpyrrolidone (hereinafter referred to as NMP) was added to a mixture comprising 90 wt % of natural graphite powder (purity: 99.3%, the above $d_{002}$=0.3355 nm, the above $L_c$: at least 200 nm, average particle size: 10 μm, hereinafter referred to as carbon material A) and 10 wt % of polyvinylidene fluoride (hereinafter referred to as PVDF), followed by stirring and mixing while applying supersonic waves, to obtain a slurry having carbon material A dispersed in a NMP solution of PVDF. This slurry was impregnated into a porous nickel sheet having a thickness of 2.0 mm, a porosity of 97%, a sheet weight of 550 g/m$^2$ and an average pore number of 25 (hereinafter referred to as porous Ni-A) and dried at 200° C. for 30 minutes, and the coated sheet was rolled to a thickness of 0.5 mm and punched into a disk having a diameter of 12.5 mm, which was used as a negative electrode.

The porosity of the compressed negative electrode was 35%, and the amount of carbon material A supported on the negative electrode was 36 mg/cm$^2$. As shown in FIG. 1, this negative electrode was bonded to a SUS304 cover 4 by a graphite type electroconductive adhesive (hereinafter referred to simply as an electroconductive adhesive) 2, followed by drying at 190° C. for one hour.

This cover 4 on the negative electrode 5 side and the positive electrode using the SUS316L casing 3 as a current collector, were further dried for 4 hours at 200° C. under reduced pressure. They were transferred to a glovebox of argon atmosphere, and a lithium metal foil 6 having a diameter of 10 mm and a thickness of 0.1 mm was press-joined to the negative electrode 5. The two electrodes were disposed to face each other with a propylene (hereinafter referred to as PP) separator 8 interposed between the two electrodes, to form an element, and an electrolyte 7 comprising ethylenecarbonate (hereinafter referred referred to as EC) and diethylenecarbonate (hereinafter referred to as DEC) in a volume ratio of 1:1 having 1.2 mol/l of LiPF$_6$ dissolved therein, was injected into the case to impregnate it into the element.

Then, using an insulating gasket 9 made of PP, the element and the electrolyte were crimp sealed in the case. The obtained coin-shaped EDLC had an outer diameter of 18.3 mm and a thickness of 2.0 mm. This coin-shaped EDLC was put in a thermostat at 70° C. and left to stand for 16 hours. By this heating operation, the lithium foil press-joined to the electrode 5 was ionized and chemically taken into the electrode 5 in the ionized state. The lithium ion releasing capacity d of this negative electrode (the quantity d of lithium ions releasable by this negative electrode) was 12 mAh, and the ratio bv/3.6 d was 0.17.

EXAMPLE 2

Coin-shaped EDLC was assembled in the same manner as in Example 1 except that in Example 1, instead of carbon material A, artificial graphite powder (purity: 99.9%, the above $d_{002}$=0.3365 nm, the above $L_c$=at least 50 nm, average particle size: 7 μm, hereinafter referred to as carbon material B) was used as the negative electrode, and on the positive electrode side, a casing made of a SUS304 sheet having aluminum laminated inside, was used, and on the negative electrode side, a cover made of a SUS304 having nickel plated inside, was used. The lithium ion releasing capacity of the negative electrode of this EDLC was 3.0 mAh, and the ratio bv/3.6 d was 0.67.

EXAMPLE 3

Coin-shaped EDLC was assembled in the same manner as in Example 1 except that in Example 1, instead of the natural graphite powder, graphitized meso-carbon microbeads (purity: 99.6%, the above $d_{002}$=0.3480 nm, the above $L_c$=at least 2 nm, average particle size: at most 13 μm, hereinafter referred to as carbon material C) were used for the negative electrode. The amount of carbon material B supported on the negative electrode was 29 mg/cm$^2$, and the lithium ion releasing capacity of this negative electrode was 8 mAh. The ratio bv/3.6 d of this EDLC was 0.25.

EXAMPLE 4

Coin-shaped EDLC was assembled in the same manner as in Example 1 except that in Example 1, instead of carbon material A, a baked product of petroleum coke as carbon material which is easily graphitizable (baking temperature: 1400° C., purity: 99.9%, the above $d_{002}$=3.452 nm, the above $L_c$=at least 2 nm, average particle size: 5μm, hereinafter referred to as carbon material D) was used, and as the electrolyte, the one having 1 mol/l of LiClO$_4$ dissolved in propylenecarbonate (hereinafter referred to as PC) was used. The amount of carbon material D supported on the negative electrode was 20 mg/cm$^2$, and the lithium ion releasing capacity of this negative electrode was 2.7 mAh. The ratio bv/3.6 d of this EDLC was 0.74.

EXAMPLE 5

Coin-shaped EDLC was assembled in the same manner as in Example 1 except that in Example 1, as the porous metal, a sheet-form porous nickel having a thickness of 2.0 mm, a porosity of 98%, a sheet weight of 370 g/m$^2$ and an average pore number being 20 (hereinafter referred to as porous Ni-B) was used, and the slurry was supported on this porous Ni-B and dried, followed by roll pressing to a thickness of 0.3 mm. The porosity of the negative electrode after roll pressing was 39%, the amount of carbon material A supported on the negative electrode was 25 mg/cm$^2$, and the lithium ion releasing capacity of this negative electrode was 10.6 mAh. The ratio bv/3.6 d of this EDLC was 0.19.

EXAMPLE 6

The same polarizable electrode sheet as prepared in Example 1, was cut into a size of 1 cm×1 cm and bonded at the forward end of an aluminum foil having a width of 1 cm, a length of 8 cm and a thickness of 45 μm by an electroconductive adhesive, to obtain a positive electrode. Then, the slurry of carbon material A prepared in Example 1 was impregnated with a sheet of porous nickel having a porosity of 97%, a thickness of 1.4 mm, an average pore number of 25 and a sheet weight of 370 g/m$^2$ (hereinafter referred to as porous Ni-C) and dried, followed by compressing to a thickness of 0.3 mm. Then, the sheet was cut into a size of 1 cm×1 cm to obtain a negative electrode, and one end of a nickel foil having a thickness of 20 µm, a width of 1 cm and a length of 7 cm was electrically welded to form a lead.

This negative electrode and a lithium sheet of 1.3 cm×1.3 cm having a thickness of 0.5 mm were disposed with a separator made of PP interposed therebetween, and dipped in an electrolyte comprising EC and DEC in a volume ratio of 1:1 having 1 mol/l of LiPF$_6$ dissolved therein. Then, a voltage of 0 (zero) V was applied for 10 hours to the lithium sheet electrode to have lithium ions electrochemically occluded in the negative electrode. The lithium ion releasing capacity of this negative electrode was 10.3 mAh.

Then, a PP separator having a thickness of 180 µm was sandwiched between the positive electrode and the negative electrode having lithium ions occluded, to obtain an element. This element was immersed in the electrolyte having the same composition as used for electrochemical occlusion of lithium ions, and EDLC was assembled in a glass container. The single electrode capacity b of this positive electrode was 3.24 F, i.e. 1.8 mAh per 2 V. The ratio bv/3.6 d of this EDLC was 0.17, and the volume of the element i.e. the total of the volumes of the positive electrode, the separator and the negative electrode was 0.1025 cm$^3$, and the energy density was 50 Wh/l.

EXAMPLE 7

An element was prepared and EDLC was assembled in the same manner as in Example 6 except that in Example 6, the pressure for roll pressing the negative electrode was increased to bring the thickness of the negative electrode to 0.18 mm, and the porosity of the negative electrode to 3%. The lithium ion releasing capacity of this negative electrode was 6.5 mAh, and the ratio bv/3.6 d of the obtained EDLC was 0.28. The volume of the element was 0.0905 cc, and the energy density was 57 Wh/l.

EXAMPLE 8

An element was prepared and EDLC was assembled in the same manner as in Example 6 except that the pressure for roll pressing the negative electrode was increased to bring the thickness of the negative electrode to 0.20 mm and the porosity of the negative electrode to 10%. The lithium ion releasing capacity of this negative electrode was 8.5 mAh, and the ratio bv/3.6 d of the obtained EDLC was 0.28. Further, the volume of the element was 0.0925 cc, and the energy density was 56 Wh/l.

EXAMPLE 9

For both the positive electrode and the negative electrode, the same polarizable electrode as the positive electrode of Example 1, was used, and it was bonded to each of a SUS316 casing and SUS316 cover by an electroconductive adhesive to form an electrode. The two electrodes were disposed to face each other with a PP separator interposed therebetween to form an element, and an electrolyte of PC containing 1 mol/l of tetraethylammonium tetrafluoroborate (hereinafter referred to as TEATFB), was impregnated to the element. Then, using an insulating gasket made of PP, the element was crimp-sealed in a coin-shaped case. The obtained coin-shaped EDLC had a diameter of 18.3 mm and a thickness of 2.0 mm.

EXAMPLE 10

Coin-shaped EDLC was assembled in the same manner as in Example 1 except that in Example 1, a lithium foil having a diameter of 8 mm and a thickness of 0.1 mm was not press-joined to the negative electrode bonded to the cover, and no heating by the thermostat was carried out.

EXAMPLE 11

Coin-shaped EDLC was assembled in the same manner as in Example 1 except that porous Ni-A was not used for the current collector for the negative electrode, and a slurry comprising carbon material A, PVDF and NMP as a solvent, was coated on the inner surface of the SUS304 cover and dried at 200° C. for 30 minutes, to obtain a negative electrode. And a lithium metal foil having a diameter of 8 mm and a thickness of 0.02 mm is press-joined to the negative electrode in Argon atmosphere. The single electrode capacity of this positive electrode was 2.0 mAh. The lithium ion releasing capacity of this negative electrode was 1.8 mAh, and the ratio bv/3.6 d was 1.1.

EXAMPLE 12

The polarizable electrode sheet as prepared in Example 1 was cut into a size of 1 cm×1 cm and bonded to the forward end of an aluminum foil having a width of 1 cm, a length of 8 cm and a thickness of 45 µm by an electroconductive adhesive, to obtain a pair of polarizable electrodes. A PP separator was interposed between the pair of polarizable electrodes to form an element, and an electrolyte of PC containing 1 mol/l of TEATFB was impregnated to the element, and EDLC was assembled in a glass container. The volume of this EDLC element was 0.127 cc, and its energy density was 10 Wh/l.

EXAMPLE 13

An EDLC element was assembled in the same manner as in Example 6 except that porous Ni-C was not used for the current collector for the negative electrode, and a nickel foil having a thickness of 20 µm, a width of 1 cm and a length of 1 cm, was used. The amount of carbon material A supported on this negative electrode was 5.5 mg/cm$^2$, and the single electrode capacity of the positive electrode was 1.8 mAh. The lithium ion releasing capacity of this negative electrode was 1.8 mAh, and the ratio bv/3.6 d of the obtained EDLC was 1.0. The volume of the element was 0.0795 cc, and its energy density was as high as 59 Wh/l. However, the charge-discharge cycle durability and the charging speed were not satisfactory.

EXAMPLE 14

The activated carbon powder as used in Example 1, KB as an electroconductive material and PVDF as a binder were mixed in the weight ratio of 45:45:10, and NMP was added thereto, followed by pulverization and mixing to obtain a slurry of activated carbon powder. Then, this slurry was uniformly impregnated into a sheet of porous Ni-C, followed by drying at 200° C. for 10 hours. This sheet was compressed by a roll press to a thickness of 0.175 mm. The compressed sheet was cut into a size of 1 cm×1 cm to obtain a pair of polarizable electrodes. Lead terminals were attached to the polarizable electrodes, and a PP separator was sandwiched between the two electrodes to obtain an element. Then, this element was put into a glass container containing an electrolyte of PC containing 1 mol/l of TEATFB, to assemble EDLC. The volume of this element was 0.053 cc, and the energy density was 6 Wh/l.

The preparation conditions of EDLC in Examples 1 to 14 are summarized in Tables 1 to 6.

TABLE 1

| Positive electrode | Example 1 | Example 2 | Example 3 | Example 4 | Example 5 |
|---|---|---|---|---|---|
| Activated carbon powder | Activated carbon A | Activated carbon A | Activated carbon A | Activated carbon A | Activated carbon A |
| Electroconductive material | KB 10 wt % | KB 10 wt % | KB 10 wt % | KB 10 wt % | KB 10 wt % |
| Binder | PTFE 10 wt % | PTFE 10 wt % | PTFE 10 wt % | PTFE 10 wt % | PTFE 10 wt % |
| Medium | Ethanol | Ethanol | Ethanol | Ethanol | Ethanol |
| Current collector | SUS316L casing only | Al-laminated SUS304 casing only | SUS316L casing only | SUS316L casing only | SUS316L casing only |
| Thickness after being rolled | 0.5 mm | 0.5 mm | 0.5 mm | 0.5 mm | 0.5 mm |
| Size | Diameter: 12.5 mm | Diameter: 12.5 mm | Diameter: 12.5 mm | Diameter: 12.5 mm | Diameter: 12.5 mm |
| Single electrode capacity b | 3.66 F | 3.66 F | 3.66 F | 3.66 F | 3.66 F |
| Capacity | 2.0 mAh/2.0 V | 2.0 mAh/2.0 V | 2.0 mAh/2.0 V | 2.0 mAh/2.0 V | 2.0 mAh/2.0 V |
| Electrical connection | Electroconductive adhesive | Electroconductive adhesive | Electroconductive adhesive | Electroconductive adhesive | Electroconductive adhesive |
| Solvent | EC/DEC volume ratio 1:1 | EC/DEC volume ratio 1:1 | EC/DEC volume ratio 1:1 | PC | EC/DEC volume ratio 1:1 |
| Solute | $LiPF_6$ 1.2 mol/l | $LiPF_6$ | $LiPF_6$ | $LiClO_4$ 1.0 mol/l | $LiPF_6$ 1.2 mol/l |
| Separator | PP | PP | PP | PP | PP |
| Gasket | PP | PP | PP | PP | PP |
| Case | Coin-shaped | Coin-shaped | Coin-shaped | Coin-shaped | Coin-shaped |

TABLE 2

| Negative electrode | Example 1 | Example 2 | Example 3 | Example 4 | Example 5 |
|---|---|---|---|---|---|
| Carbon material | Carbon material A 90 wt % | Carbon material B 90 wt % | Carbon material C 90 wt % | Carbon material D 90 wt % | Carbon material A 90 wt % |
| Binder | PVDF 10 wt % | PVDF 10 wt % | PVDF 10 wt % | PVDF 10 wt % | PVDF 10 wt % |
| Slurry medium | NMP | NMP | NMP | NMP | NMP |
| Current collector | Porous Ni-A | Porous Ni-A | Porous Ni-A | Porous Ni-A | Porous Ni-B |
| Thickness after being compressed | 0.5 mm | 0.5 mm | 0.5 mm | 0.5 mm | 0.3 mm |
| Porosity | 35% | 35% | 35% | 35% | 39% |
| Size | Diameter: 12.5 mm | Diameter: 12.5 mm | Diameter: 12.5 mm | Diameter: 12.5 mm | Diameter: 12.5 mm |
| Supported amount of carbon material | 36 mg/cm$^2$ | 29 mg/cm$^2$ | 34 mg/cm$^2$ | 20 mg/cm$^2$ | 25 mg/cm$^2$ |
| Connected to | SUS304 cover | Ni-plated SUS304 cover | SUS304 cover | SUS304 cover | SUS304 cover |
| Electrical connection | Electroconductive adhesive | Electroconductive adhesive | Electroconductive adhesive | Electroconductive adhesive | Electroconductive adhesive |
| Lithium ion occluding method | Chemical method | Chemical method | Chemical method | Chemical method | Chemical method |
| Lithium ion releasing capacity | d = 12 mAh | d = 3.0 mAh | d = 8 mAh | d = 2.7 mAh | d = 10.6 mAh |

TABLE 3

| Positive electrode | Example 6 | Example 7 | Example 8 | Example 9 | Example 10 |
|---|---|---|---|---|---|
| Activated carbon powder | Activated carbon A 80 wt % | Activated carbon A 80 wt % | Activated carbon A 80 wt % | Activated carbon A 80 wt % | Activated carbon A 80 wt % |
| Electroconductive material | KB 10 wt % | KB 10 wt % | KB 10 wt % | KB 10 wt % | KB 10 wt % |
| Binder | PTFE 10 wt % | PTFE 10 wt % | PTFE 10 wt % | PTFE 10 wt % | PTFE 10 wt % |
| Medium | Ethanol | Ethanol | Ethanol | Ethanol | Ethanol |
| Current collector | Al foil of 45 μm thick | Al foil of 45 μm thick | Al foil of 45 μm thick | SUS316L casing only | SUS316L casing only |
| Thickness after being rolled | 0.5 mm | 0.5 mm | 0.5 mm | 0.5 mm | 0.5 mm |
| Size | 10 mm × 10 mm | 10 mm × 10 mm | 10 mm × 10 mm | Diameter: 12 mm | Diameter: 12 mm |
| Single electrode capacity b | 3.24 F | 3.24 F | 3.24 F | — | 3.66 F |
| Capacity | 1.8 mAh/2.0 V | 1.8 mAh/2.0 V | 1.8 mAh/2.0 V | — | 2.0 mAh/2.0 V |
| Electrical connection | Electroconductive adhesive | Electroconductive adhesive | Electroconductive adhesive | Electroconductive adhesive | Electroconductive adhesive |
| Solvent | EC/DEC volume ratio 1:1 | EC/DEC volume ratio 1:1 | EC/DEC volume ratio 1:1 | PC | EC/DEC volume ratio 1:1 |
| Solute | $LiPF_6$ 1.0 mol/l | $LiPF_6$ 1.0 mol/l | $LiPF_6$ 1.0 mol/l | $(C_2H_5)_4NBF_4$ 1.0 mol/l | $LiPF_6$ 1.0 mol/l |
| Separator | PP | PP | PP | PP | PP |
| Gasket | — | — | — | PP | PP |
| Case | Glass | Glass | Glass | Coin-shaped | Coin-shaped |
| Volume of element | 0.1025 cm$^3$ | 0.0905 cm$^3$ | 0.0925 cm$^3$ | — | — |
| Energy density | 50 Wh/l | 57 Wh/l | 56 Wh/l | — | — |

TABLE 4

| Negative electrode | Example 6 | Example 7 | Example 8 | Example 9 | Example 10 |
|---|---|---|---|---|---|
| Carbon material | Carbon material A 90 wt % | Carbon material A 90 wt % | Carbon material A 90 wt % | Source as used for positive electrode | Carbon material A 90 wt % |
| Binder | PVDF 10 wt % | PVDF 10 wt % | PVDF 10 wt % | | PVDF 10 wt % |
| Slurry medium | NMP | NMP | NMP | | NMP |
| Current collector | Porous Ni-C | Porous Ni-C | Porous Ni-C | | Porous Ni-A |
| Thickness after being compressed | 0.3 mm | 0.18 mm | 0.20 mm | | 0.5 mm |
| Porosity | 39% | 3% | 10% | | 35% |
| Size | 10 mm × 10 mm | 10 mm × 10 mm | 10 mm × 10 mm | | Diameter: 12.5 mm |
| Supported amount of carbon material | — | — | — | | 36 mg/cm$^2$ |
| Connected to | Ni foil of 20 $\mu$m | Ni foil of 20 $\mu$m | Ni foil of 20 $\mu$m | | SUS304 cover |
| Electrical connection | Electric welding | Electric welding | Electric welding | | Electroconductive adhesive |
| Lithium ion occluding method | Electrochemical method | Electrochemical method | Electrochemical method | Nil | Nil |
| Lithium ion releasing capacity | d = 10.3 mAh | d = 6.5 mAh | d = 8.5 mAh | Nil | Nil |

TABLE 5

| Positive electrode | Example 11 | Example 12 | Example 13 | Example 14 |
|---|---|---|---|---|
| Activated carbon powder | Activated carbon A 80 wt % | Activated carbon A 80 wt % | Activated carbon A 80 wt % | Activated carbon A 45 wt % |
| Electroconductive material | KP 10 wt % | KP 10 wt % | KP 10 wt % | KP 45 wt % |
| Binder | PTFE 10 wt % | PTFE 10 wt % | PTFE 10 wt % | PVDF 10 wt % |
| Medium | Ethanol | Ethanol | Ethanol | NMP |
| Current collector | SUS316L casing only | Al foil of 45 $\mu$m thick | Al foil of 45 $\mu$m thick | Porous Ni-C |
| Thickness after being compressed | 0.5 mm | 0.5 mm | 0.5 mm | 0.175 mm |
| Size | Diameter: 12 mm | 10 mm × 10 mm | 10 mm × 10 mm | 10 mm × 10 mm |
| Single electrode capacity b | 3.66 F | — | 3.24 F | — |
| Capacity | 2.0 mAh/2.0 V | — | 1.8 mAh/2.0 V | — |
| Electrical connection | Electroconductive adhesive | Electroconductive adhesive | Electroconductive adhesive | Electroconductive adhesive |
| Solvent | EC/DEC volume ratio 1:1 | PC | EC/DEC volume ratio 1:1 | PC |
| Solute | LiPF$_6$ 1.2 mol/l | (Et)$_4$NBF$_4$ 1.0 mol/l | LiPF$_6$ 1.2 mol/l | (Et)$_4$NBF$_4$ 1.0 mol/l |
| Separator | PP | PP | PP | PP |
| Gasket | PP | — | — | — |
| Case | Coin-shaped | Glass | Glass | Glass |
| Volume of element | — | 0.127 cm$^3$ | 0.0795 cm$^3$ | 0.053 cm$^3$ |
| Energy density | — | 10 Wh/l | 59 Wh/l | 6 Wh/l |

TABLE 6

| Negative electrode | Example 11 | Example 12 | Example 13 | Example 14 |
|---|---|---|---|---|
| Carbon material | Carbon material A 90 wt % | Source as used for positive electrode | Carbon material A 90 wt % | Source as used for positive electrode |
| Binder | PVDF 10 wt % | | PVDF 10 wt % | |
| Slurry medium | NMP | | NMP | |
| Current collector | SUS316 cover only | | Al foil of 20 $\mu$m thick | |
| Thickness after being compressed | — | | — | |
| Porosity | — | | — | |
| Size | Diameter: 12.5 mm | 10 mm × 10 mm | 10 mm × 10 mm | 10 mm × 10 mm |
| Supported amount of carbon material | 34 mg/cm$^2$ | — | 5.5 mg/cm$^2$ | — |
| Electrical connection | Direct coating | | Electric welding | |
| Lithium ion occluding method | Chemical method | Nil | Electrochemical method | Nil |
| Lithium ion releasing capacity | d = 1.8 mAh | Nil | d = 1.8 mAh | Nil |

Now, with respect to EDLC of Examples 1 to 8 as Working Examples of the present invention and Examples 9 to 14 as Comparative Examples, charging was conducted for 2 hours with a charge current density of 2 mA/cm$^2$ at the maximum, followed by constant current discharge with 1 mA/cm$^2$. The initial capacity, the charged voltage (selected) and the working voltage range of each EDLC were obtained, and the results are summarized in Table 7. From the comparison between Examples 1 to 5 and Examples 9 to 11 and between Examples 6 to 8 and Examples 12 and 14 in Table 7, it is evident that EDLC of the present invention is distinctly superior in the initial capacity and the working voltage range.

Next, with respect to EDLC of Examples 6 to 8 and Example 13, charging was carried out for 30 minutes within a working voltage range of from 2.0 to 3.3 V with a maximum current of 10 mA/cm², and the charge accomplishing ratio (%) was measured relative to the charged quantity for 30 minutes being rated as 100%. The results are shown in Table 8. From the results in Table 8, it is evident that EDLC of the present invention is superior in the charging speed. Further, with respect to EDLC of Examples 6 to 8 and Example 13, a charge-discharge cycle test was carried out within a working voltage range of from 2.0 to 3.3 V with a maximum charging current of 10 mA/cm² and a constant current discharging current of 1 mA/cm², whereby the results of measurement of the capacity change are shown in Table 9. From Table 9, it is evident that EDLC of the present invention is superior in the charge-discharge cycle durability.

TABLE 7

|  | Initial capacity | Charged voltage | Working voltage range | bv/3.6d |
|---|---|---|---|---|
| Example 1 | 3.4 F | 4.0 V | 2.0–4.0 V | 0.17 |
| Example 2 | 3.2 | 4.0 | 2.0–4.0 | 0.67 |
| Example 3 | 3.3 | 4.0 | 2.0–4.0 | 0.25 |
| Example 4 | 3.0 | 4.0 | 2.0–4.0 | 0.74 |
| Example 5 | 3.5 | 4.0 | 2.0–4.0 | 0.19 |
| Example 6 | 3.1 | 4.0 | 2.0–4.0 | 0.17 |
| Example 7 | 3.1 | 4.0 | 2.0–4.0 | 0.28 |
| Example 8 | 3.1 | 4.0 | 2.0–4.0 | 0.28 |
| Example 9 | 1.8 F | 2.4 V | 0.0–2.4 V | — |
| Example 10 | 0.8 | 3.0 | 2.0–3.0 | — |
| Example 11 | 2.5 | 4.0 | 2.0–4.0 | 1.1 |
| Example 12 | 1.6 | 2.5 | 0.0–2.5 | — |
| Example 13 | 2.8 | 4.0 | 2.0–4.0 | 1.0 |
| Example 14 | 0.4 | 2.4 | 0.0–2.4 | — |

TABLE 8

| Charging time | Example 6 | Example 7 | Example 8 | Example 13 |
|---|---|---|---|---|
| 2.5 minutes | 75% | 70% | 72% | 40% |
| 5 | 92 | 87 | 90 | 55 |
| 10 | 98 | 95 | 97 | 80 |
| 20 | 100 | 95 | 98 | 95 |
| 30 | 100 | 100 | 100 | 100 |

TABLE 9

|  | Initial | After 100 cycles | After 300 cycles |
|---|---|---|---|
| Example 6 | 3.1 F | 3.0 F | 2.9 F |
| Example 7 | 3.0 | 2.0 | 0.9 |
| Example 8 | 3.0 | 2.6 | 2.1 |
| Example 13 | 2.9 F | 0.6 F | 0.1 F |

From the results shown in the above Tables 7 to 9, it is evident that EDLC of the present invention has a high working voltage and a large capacity and is capable of rapid charging and discharging and excellent in the charge-discharge cycle durability.

EXAMPLE 21

NMP was added to a mixture comprising 73 wt % of molten potassium hydroxide activation treated phenol resin type activated carbon powder (specific surface area: 2100 m²/g, average particle size: about 5 μm, hereinafter referred to as activated carbon B), 17 wt % of KB and 10 wt % of PVDF, followed by mixing to obtain a slurry. This slurry was impregnated into a porous Ni-A sheet and dried at 200° C. for 30 minutes. Then, this sheet was roll-pressed to a thickness of 1.0 mm. The porosity of the compressed sheet was 35%. This sheet was punched into a disk having a diameter of 12.5 mm to obtain a polarizable electrode.

This polarizable electrode was bonded to the inside of a stainless steel 316L casing of coin-shaped EDLC by an electroconductive adhesive to obtain a positive electrode. The single electrode capacity b of this positive electrode was 6.2 F, i.e. the capacity at the working voltage range of from 2.0 to 3.3 V was 2.2 mAh.

Then, a negative electrode was prepared. Namely, NMP was added to a mixture comprising 90 wt % of carbon material A and 10 wt % of PVDF, and the mixture was stirred and mixed while applying supersonic waves to obtain a slurry having carbon material A dispersed in a NMP solution of PVDF. This slurry was impregnated into a sheet of porous nickel having a thickness of 1.7 mm, a porosity of 98%, a sheet weight of 370 g/m² and an average pore number per 1 cm length of 25 (hereinafter referred to as porous Ni-D) and dried at 200° C. for 30 minutes. Then, this sheet was roll-pressed to a thickness of 0.3 mm to bring the porosity to 35%.

The compressed sheet was punched into a disk having a diameter of 12.5 mm to obtain a negative electrode, and the amount of carbon material A on the negative electrode was 30 mg/cm². This negative electrode was electrically welded to a SUS304 cover and dried at 200° C. for 1 hour.

This cover having the negative electrode welded and the SUS316L casing having the positive electrode bonded by the electroconductive adhesive were further dried for 4 hours at 200° C. under reduced pressure. They were transferred to glovebox of argon atmosphere, and a lithium foil having a diameter of 10 mm and a thickness of 0.7 mm was press-joined to the negative electrode. Then, the two electrodes were disposed to face each other with a PP separator interposed therebetween, and a nonaqueous electrolyte comprising EC and DEC (volume ratio of 1:1) having 1.0 mol/l of $LiPF_6$ dissolved, was injected into the casing to impregnate the nonaqueous electrolyte to the element. Then, using an insulating gasket made of PP, the element and the electrolyte were crimp-sealed in the case.

The obtained coin-shaped EDLC had a diameter of 18.3 mm and a thickness of 2.0 mm. This coin-shaped EDLC was put in a thermostat at 70° C. and maintained for 2 days. By this heating operation, the lithium foil press-joined to the negative electrode 5 was ionized and taken into the carbon material of the negative electrode in the ionized state (chemical method). The lithium ion releasing capacity d of this negative electrode was 10 mAh, and the ratio bv/3.6 d was 0.22. The working voltage range of this EDLC was from 2.0 to 3.3 V, and the initial electrostatic capacitance was 5.8 F, and the internal resistance was 20Ω.

A charge-discharge cycle test was carried out by charging this coin-shaped EDLC for 30 minutes with a maximum charging current of 10 mA/cm², followed by constant current discharging with 1 mA/cm². Charging and discharging were carried out for 50 cycles within a working voltage of from 2.0 to 3.3 V, whereby no decrease in the capacity was observed. Then, a charge-discharge cycle test was carried out within a voltage of from 2.0 to 4.0 V, whereby the capacity decreased to 30% of the initial capacity after 50 cycles.

EXAMPLE 22

As the carbon material of the negative electrode, a baked product of a phenol resin (purity: 99.9%, lattice spacing $d_{002}$=0.38 nm, hereinafter referred to as carbon material E)

was used, and as the binder thereof, a polyimide (hereinafter referred to as PI) was used. For the casing on the negative electrode side, a SUS304 sheet having nickel plated inside, was used. Further, for the cover of the positive electrode, a laminated sheet having aluminum laminated on the inside surface of SUS304, was used, and for the current collector of the electrode, a sheet of porous aluminum having a thickness of 2 mm, a porosity of 92% and an average pore number of 17 (hereinafter referred to as porous Al-A) was used.

For the positive electrode, a slurry of the polarizable material prepared in Example 21 was impregnated into a sheet of porous Al-A and dried, followed by pressing to compress the sheet to a thickness of 1.0 mm. The porosity of this compressed sheet was 30%. This sheet was punched out into a disk to obtain a positive electrode, which was bonded to a cover by an electroconductive adhesive. The single electrode capacity of this positive electrode was 5.5 F. The amount of carbon material A supported on the negative electrode was 23 mg/cm$^2$, the thickness was 0.2 mm, and the porosity was 27%. The lithium ion releasing capacity of the negative electrode was 6.8 mAh.

Then, coin-shaped EDLC was assembled in the same manner as in Example 21 except that as the nonaqueous electrolyte, the one having 1 mol/l of LiClO$_4$ dissolved in PC, was used. The working voltage range of this EDLC was from 2.0 to 4.0 V, and the capacity within this working voltage range was 3.1 mAh, and the ratio bv/3.6 d was 0.46. The initial electrostatic capacitance of this EDLC was 5.0 F, and the internal resistance was 18Ω.

EXAMPLE 23

Coin-shaped EDLC was assembled in the same manner as in Example 21 except that carbon material C was used for the negative electrode, and a nonaqueous electrolyte having 1 mol/l of LiN(CF$_3$SO$_2$)$_2$ dissolved in a solvent mixture comprising EC and ethyl methyl carbonate (hereinafter referred to as EMC) in a volume ratio of 1:1, was used. The amount of carbon material C supported on the negative electrode was 35 mg/cm$^2$, and lithium ion releasing capacity of the negative electrode was 5.0 mAh. The ratio bv/3.6 d of the obtained EDLC was 0.45. Further, the working voltage range of this EDLC was from 2.0 to 3.3 V, the initial electrostatic capacitance was 5.0 F, and the internal resistance was 24Ω.

EXAMPLE 24

Coin-shaped EDLC was assembled in the same manner as in Example 21 except that carbon material D was used for the negative electrode, and a nonaqueous electrolyte having 1 mol/l of LiBF$_4$ dissolved in a solvent mixture comprising EC and DEC in a volume ratio of 1:1, was used. The amount of carbon material D supported on the negative electrode was 30 mg/cm$^2$, the thickness was 0.3 mm, the porosity was 47%, and the lithium ion releasing capacity of the negative electrode was 3.8 mAh. The ratio bv/3.6 d of the obtained EDLC was 0.59, and the working voltage range was from 2.0 to 3.3 V. The initial electrostatic capacitance was 4.5 F, and the internal resistance was 25Ω.

EXAMPLE 25

For the current collector of the negative electrode, a sheet of porous nickel having a thickness of 1.4 mm, a porosity of 97%, an average pore number of 20 and a sheet weight of 370 g/m$^2$ (hereinafter referred to a porous Ni-E) was used, and a slurry of carbon material C prepared in Example 22 was coated on this sheet and dried, followed by rolling to compress the sheet to a thickness of 0.3 mm to obtain a negative electrode. The porosity of the compressed negative electrode was 46%, and the amount of carbon material E supported thereon was 25 mg/cm$^2$. The lithium ion releasing capacity of the negative electrode was 7.3 mAh. Coin-shaped EDLC was assembled in the same manner as in Example 22 except that a nonaqueous electrolyte having 1 mol/l of LiBF$_4$ dissolved in a solvent mixture comprising sulfolane (hereinafter referred to as SF) and DEC in a volume ratio of 4:1, was used. The single electrode capacity b of the positive electrode was 5.5 F, and the working voltage range of the obtained EDLC was from 2.0 to 3.7 V. The initial electrostatic capacitance was 5.2 F, the ratio bv/3.6 d was 0.42, and the internal resistance was 19Ω.

EXAMPLE 26

Porous Al-A was cut into a section having a width of 1 cm and a length of 7 cm, and the portion corresponding to 6 cm except for 1 cm at one end was pressed to a thickness of 0.2 mm to form a lead for the positive electrode, and a slurry of the polarizable electrode material prepared in Example 22 was impregnated into the non-compressed portion of 1 cm×1 cm and dried at 200° C. for 30 minutes. The portion having the polarizable electrode material supported thereon was compressed by pressing to a thickness of 1.0 mm to form a positive electrode. The porosity of this positive electrode was 28%, and the single electrode capacity b was 5.4 F.

Then, the porous Ni-D sheet used in Example 22 was cut into a section having a width of 1 cm and a length of 7 cm, and the portion corresponding to 6 cm except for 1 cm of one end, was compressed by pressing to a thickness of 0.2 mm to form a lead for the negative electrode, and the slurry of carbon material E prepared in Example 22 was impregnated into the non-compressed portion of 1 cm×1 cm and dried at 200° C. for 30 minutes. The portion having the carbon material supported thereon, was compressed by pressing to a thickness of 0.3 mm to obtain a negative electrode having a porosity of 35%.

This negative electrode and a lithium sheet of 1.3 cm×1.3 cm having a thickness of 0.5 mm were disposed to face each other with a separator made of PP interposed therebetween, and they were immersed in a nonaqueous electrolyte having 1 mol/l of LiClO$_4$ dissolved in PC. Then, a voltage of 0.01 V was applied to the lithium sheet electrode for 10 hours to electrochemically occlude lithium ions in carbon material of the negative electrode. The lithium ion releasing capacity of this negative electrode was 5.6 mAh.

Then, a separator made of PP having a thickness of 180 μm was sandwiched between the positive electrode having the polarizable electrode material supported thereon and the negative electrode having lithium ions occluded therein to obtain an element, and the same nonaqueous electrolyte as used for occlusion of lithium ions, was impregnated to this element, and EDLC was assembled in a PP container.

The working voltage range of this EDLC was from 2.0 to 4.0 V, the initial electrostatic capacitance was 3.0 mAh, the ratio bv/3.6 d was 0.54, and the internal resistance was 27Ω. Further, the volume of this element was 0.148 cc, and the energy density was 40 Wh/l. A charge-discharge cycle test at a working voltage of from 2.0 to 4.0 V was carried out by charging this EDLC with a maximum charge current of 10 mA/cm$^2$, followed by constant current discharge with 1 mA/cm$^2$. As a result, the capacity after 500 cycles was 90% of the initial capacity.

EXAMPLE 27

EDLC was assembled in the same manner as in Example 26 except that in Example 26, the pressure for compressing the positive electrode and the negative electrode was increased, and the porosity of each of the positive electrode and the negative electrode after compression was 8%. The single electrode capacity of the positive electrode was 5.1 F, and the initial electrostatic capacitance of this capacitor was 4.0 F, and the capacity within the working voltage range of from 2.0 to 4.0, was 2.8 mAh, the ratio bv/3.6 d was 0.67, and the internal resistance was 38Ω. In the same manner as in Example 26, a charge-discharge cycle test was carried out with a working voltage within a range of from 2.0 to 4.0 V, whereby the capacity after 50 cycles was 70% of the initial capacity.

EXAMPLE 28

Et was added to a mixture comprising 60 wt % of activated carbon B, 30 wt % of KB and 10 wt % of PTFE, followed by kneading and molding into a sheet having a thickness of 0.5 mm. From this sheet, two sheets of a size of 1 cm×1 cm were cut out. Then, a porous aluminum sheet having a thickness of 2.7 mm, a porosity of 90% and an average pore number per 1 cm of 20 (hereinafter referred to as porous Al-B) was cut into a section having a width of 1 cm and a length of 7 cm, and the portion corresponding to 6 cm except for 1 cm at one end, was compressed by pressing to obtain a lead having a thickness of 0.4 mm. The above-mentioned two small sheets were placed on both sides of the non-compressed portion of 1 cm×1 cm of the sheet of porous Al-B, followed by compressing by pressing to inject the polarizable electrode material into the sheet of porous Al-B and dried at 170° C. to obtain a positive electrode having a thickness of 0.8 mm Using a baked product of a novolak resin having an average particle size of 10 μm, a purity of 99.5 wt % and a lattice spacing $d_{002}$ of 0.345 nm (hereinafter referred to as carbon material F) as the carbon material, a slurry was prepared containing 90 wt % of carbon material F and 10 wt % of PI in NMP as the medium. Further, from porous Ni-D, a sheet having a width of 1 cm and a length of 7 cm was cut out, and the portion corresponding to 6 cm except for 1 cm at one end was compressed by pressing to form a lead having a thickness of 0.2 mm. The above-mentioned slurry was impregnated into the non-compressed portion of 1 cm×1 cm of porous Ni-D and dried at 200° C. for 30 minutes, followed by compressing by pressing to a thickness of 0.3 mm to obtain a negative electrode having a porosity of 35%. A separator made of PP was sandwiched between this negative electrode and a lithium sheet of 1.3 cm×1.3 cm having a thickness of 0.5 mm, and they were immersed in a nonaqueous electrolyte having 1 mol/l of $LiClO_4$ dissolved in PC. In this state, a voltage of 0.01 V was applied to the lithium sheet electrode for 10 hours to have lithium ions occluded in the carbon material of the negative electrode. The lithium ion releasing capacity of this negative electrode was 8.7 mAh. Then, EDLC was assembled in the same manner as in Example 26. The initial electrostatic capacitance of this EDLC was 2.7 F, the capacity within the working voltage range of from 2.0 to 4.0 V was 1.6 mAh, the ratio bv/3.6 d was 0.17, and the internal resistance was 22Ω. Further, the volume of the element was 0.126 $cm^3$, and the energy density was 36 Wh/l.

EXAMPLE 29

The slurry used for the preparation of the positive electrode in Example 26, was impregnated into a sheet of porous Ni-A used in Example 21 and dried at 200° C. for 30 minutes, and the sheet was compressed by pressing to a thickness of 0.6 mm and dried at 200° C. for 2 hours. This sheet was punched out into disks each having a diameter of 12.5 mm. The obtained two polarizable electrodes were electrically welded to a SUS316L casing and a SUS316L cover, respectively. The porosity of the two electrodes was 35%, and the single electrode capacity of the positive electrode was 3.8 F.

A separator made of PP was sandwiched between the two electrodes to obtain an element. This element was accommodated in a coin-shaped casing made of SUS316L, and a nonaqueous electrolyte having 1 mol/l of $LiClO_4$ dissolved in PC, was injected into the casing. Then, using an insulating gasket made of PP, the element and the nonaqueous electrolyte was crimp-sealed in the casing with a cover made of a SUS316L. The working voltage range of this coin-shaped EDLC was from 0 to 2.0 V, the initial electrostatic capacitance was 1.9 F, the capacity was 1.1 mAh, and the internal resistance was 15Ω.

EXAMPLE 30

Coin-shaped EDLC was assembled in the same manner as in Example 21 except that a flat nickel foil having a thickness of 0.1 mm was used as the current collector of the negative electrode, and the slurry of carbon material B prepared in Example 21 was coated thereon to obtain a negative electrode. In this case, if the electrode layer was coated thickly on the nickel foil current collector, the electrode layer tended to peel from the current collector, whereby the current collecting characteristic tended to be unstable. Therefore, the thickness of the electrode layer was adjusted to 0.08 mm. The lithium ion releasing capacity of this negative electrode was 3.5 mAh. The single electrode capacity b of the positive electrode was 6.2 F, and the capacity within the working voltage range of from 2.0 to 3.3 V of the obtained EDLC was 2.2 mAh. The initial electrostatic capacitance was 4.5 F, bv/3.6 d was 0.64, and the internal resistance was 33Ω.

EXAMPLE 31

Instead of PVDF in Example 1, 10 wt % of PTFE was used as the binder for the positive electrode and kneaded with Et as a medium. The kneaded product was formed into a sheet having a thickness of 1.0 mm and dried at 200° C. for 3 hours. This sheet was punched out into a disk having a diameter of 12.5 mm to obtain a polarizable electrode. This polarizable electrode was bonded to a casing of SUS316L by an electroconductive adhesive to obtain a positive electrode. Coin-shaped EDLC was assembled in the same manner as in Example 21. The single electrode capacity b of this positive electrode was 6.4 F, the initial capacity of the obtained EDLC was 4.9 F, and the capacity within the working voltage range of from 2.2 to 3.5 V was 2.3 mAh. Further, the lithium ion releasing capacity of the negative electrode was 10.3 mAh, the ratio bv/3.6 d of the obtained EDLC was 0.22, and the internal resistance was 40Ω.

Porous nickel used in the above Examples was the one manufactured by Sumitomo Electric Industry (Celmet, tradename), and porous aluminum was the one manufactured by Energy Research Generation Co., U.S.A. (DUOCEL, tradename).

The preparation conditions of EDLC in the above Examples 20 to 31, and the test results are summarized in Tables 10 to 13.

TABLE 10

| Positive electrode | Example 21 | Example 22 | Example 23 | Example 24 | Example 25 |
|---|---|---|---|---|---|
| Activated carbon powder | Activated carbon B 73 wt % | Activated carbon B 73 wt % | Activated carbon B 73 wt % | Activated carbon B 73 wt % | Activated carbon B 73 wt % |
| Electroconductive material | KB 17 wt % | KB 17 wt % | KB 17 wt % | KB 17 wt % | KB 17 wt % |
| Binder | PVDF 10 wt % | PVDF 10 wt % | PVDF 10 wt % | PVDF 10 wt % | PVDF 10 wt % |
| Slurry medium | NMP | NMP | NMP | NMP | NMP |
| Current collector | Porous Ni-A | Porous Al-A | Porous Ni-A | Porous Ni-A | Porous Al-A |
| Thickness after being compressed | 1.0 mm | 1.0 mm | 1.0 mm | 1.0 mm | 1.0 mm |
| Porosity after being compressed | 35% | 30% | 35% | 35% | 30% |
| Size | Diameter: 12.5 mm | Diameter: 12.5 mm | Diameter: 12.5 mm | Diameter: 12.5 mm | Diameter: 12.5 mm |
| Single electrode capacity b | 6.2 F | 5.5 F | 6.2 F | 6.2 F | 5.5 F |
| Capacity | 2.2 mAh/1.3 V | 3.1 mAh/2.0 V | 2.2 mAh/1.3 V | 2.2 mAh/1.3 V | 2.5 mAh/1.7 V |
| Connected to | SUS316L casing | Al/SUS304 laminated cover | SUS316L casing | SUS316L casing | Al/SUS304 laminated cover |
| Electrical connection | Electroconductive adhesive | Electroconductive adhesive | Electroconductive adhesive | Electroconductive adhesive | Electroconductive adhesive |
| Solvent | EC/DEC volume ratio 1:1 | PC | EC/EMC volume ratio 1:1 | EC/DEC volume ratio 1:1 | SF/DEC volume ratio 4:1 |
| Solute | $LiPF_6$ 1.0 mol/l | $LiClO_4$ 1.0 mol/l | $LiN(CF_3SO_2)_2$ 1.0 mol/l | $LiBF_4$ 1.0 mol/l | $LiBF_4$ 1.2 mol/l |
| Separator | PP | PP | PP | PP | PP |
| Gasket | PP | PP | PP | PP | PP |
| Case | Coin-shaped | Coin-shaped | Coin-shaped | Coin-shaped | Coin-shaped |
| Initial capacity | 5.8 F | 5.0 F | 5.0 F | 4.5 F | 5.2 F |
| Working voltage range | 2.0–3.3 V | 2.0–4.0 V | 2.0–3.3 V | 2.0–3.3 V | 2.0–3.7 V |
| Internal resistance | 20 Ω | 18 Ω | 24 Ω | 25 Ω | 19 Ω |
| bv/3.6 d | 0.22 | 0.46 | 0.45 | 0.59 | 0.42 |
| 2.0–4.0 V | Capacity reduced by 70% after 50 cycles | Capacity reduced by 5% after 50 cycles | Capacity reduced by 40% after 50 cycles | — | — |

TABLE 11

| Negative electrode | Example 21 | Example 22 | Example 23 | Example 24 | Example 25 |
|---|---|---|---|---|---|
| Carbon material | Carbon material A 90 wt % | Carbon material E 90 wt % | Carbon material C 90 wt % | Carbon material D 90 wt % | Carbon material E 90 wt % |
| Binder | PVDF 10 wt % | PI 10 wt % | PVDF 10 wt % | PVDF 10 wt % | PI 10 wt % |
| Slurry medium | NMP | NMP | NMP | NMP | NMP |
| Current collector | Porous Ni-D | Porous Ni-D | Porous Ni-D | Porous Ni-D | Porous Ni-E |
| Thickness after being compressed | 0.3 mm | 0.2 mm | 0.3 mm | 0.3 mm | 0.3 mm |
| Porosity | 35% | 27% | 30% | 47% | 46% |
| Size | Diameter: 12.5 mm | Diameter: 12.5 mm | Diameter: 12.5 mm | Diameter: 12.5 mm | Diameter: 12.5 mm |
| Supported amount of carbon material | 30 mg/cm$^2$ | 23 mg/cm$^2$ | 35 mg/cm$^2$ | 30 mg/cm$^2$ | 25 mg/cm$^2$ |
| Connected to | SUS304 cover | Inside Ni-plated SUS304 casing | SUS304 cover | SUS304 cover | Inside Ni-plated SUS304 casing |
| Electrical connection | Electric welding | Electric welding | Electric welding | Electric welding | Electric welding |
| Lithium ion occluding method | Chemical method | Chemical method | Chemical method | Chemical method | Chemical method |
| Lithium ion releasing capacity | 10 mAh | 6.8 mAh | 5.0 mAh | 3.8 mAh | 7.3 mAh |

TABLE 12

| Positive electrode | Example 26 | Example 27 | Example 28 | Example 29 | Example 30 | Example 31 |
|---|---|---|---|---|---|---|
| Activated carbon powder | Activated carbon B 73 wt % | Activated carbon B 73 wt % | Activated carbon B 60 wt % | Activated carbon B 73 wt % | Activated carbon B 73 wt % | Activated carbon B 73 wt % |
| Electroconductive material | KB 17 wt % | KB 17 wt % | KB 30 wt % | KB 17 wt % | KB 17 wt % | KB 17 wt % |
| Binder | PVDF 10 wt % | PVDF 10 wt % | PTFE 10 wt % | PVDF 10 wt % | PVDF 10 wt % | PTFE 10 wt % |
| Slurry medium | NMP | NMP | Ethanol | NMP | NMP | Ethanol |
| Current collector | Porous Al-A | Porous Al-A | Porous Al-B | Porous Ni-A | Porous Ni-A | SUS316L casing only |
| Thickness after being compressed | 1.0 mm | 0.7 mm | 0.8 mm | 0.6 mm | 1.0 mm | 1.0 mm |
| Porosity after being compressed | 28% | 8% | 35% | 35% | 35% | — |
| Size | 10 mm × 10 mm | 10 mm × 10 mm | 10 mm × 10 mm | Diameter: 12.5 mm | Diameter: 12.5 mm | Diameter: 12.5 mm |
| Single electrode capacity b | 5.4 F | 5.1 F | 2.9 F | 3.8 F | 6.2 F | 6.4 F |
| Capacity | 3.0 mAh/2.0 V | 2.8 mAh/2.0 V | 1.6 mAh/2.0 V | 2.1 mAh/2.0 V | 2.2 mAh/1.3 V | 2.3 mAh/1.3 V |
| Electrical connection | — | — | — | Electric welding | Electroconductive | Electroconductive |

TABLE 12-continued

| Positive electrode | Example 26 | Example 27 | Example 28 | Example 29 | Example 30 | Example 31 |
|---|---|---|---|---|---|---|
| Solvent | PC | PC | PC | PC | adhesive EC/DEC volume ratio 1:1 | adhesive EC/DEC volume ratio 1:1 |
| Solute | LiClO$_4$ 1.0 mol/l | LiClO$_4$ | LiClO$_4$ | LiPF$_6$ | LiPF$_6$ 1.0 mol/l | LiPF$_6$ |
| Separator | PP | PP | PP | PP | PP | PP |
| Gasket | — | — | — | PP | PP | PP |
| Case | PP | PP | PP | Coin-shaped | Coin-shaped | Coin-shaped |
| Initial capacity | 4.8 F | 4.0 F | 2.7 F | 1.9 F | 4.5 F | 4.9 F |
| Working voltage range | 2.0–4.0 V | 2.0–4.0 V | 2.0–4.0 V | 0–2.0 V | 2.0–3.3 V | 2.2–3.5 V |
| Current capacity | 3.0 mAh | 2.8 mAh | 1.6 mAh | 1.1 mAh | 2.2 mAh | 2.3 mAh |
| Internal resistance | 27 Ω | 38 Ω | 22 Ω | 15 Ω | 33 Ω | 40 Ω |
| bv/3.6 d | 0.54 | 0.67 | 0.17 | — | 0.64 | 0.22 |
| 2.0–4.0 V | Capacity reduced by 10% after 500 cycles | Capacity reduced by 30% after 50 cycles | — | — | — | — |
| Volume of element | 0.148 cm$^3$ | 0.101 cm$^3$ | 0.126 cm$^3$ | — | — | — |
| Energy density | 54 Wh/l | 66 Wh/l | 36 Wh/l | — | — | — |

TABLE 13

| Negative electrode | Example 26 | Example 27 | Example 28 | Example 29 | Example 30 | Example 31 |
|---|---|---|---|---|---|---|
| Carbon material | Carbon material B 90 wt % | Carbon material B 90 wt % | Carbon material F 90 wt % | Source as used for positive electrode | Carbon material A 90 wt % | Carbon material A 90 wt % |
| Binder | PI 10 wt % | PI 10 wt % | PI 10 wt % | | PVDF 10 wt % | PVDF 10 wt % |
| Slurry medium | NMP | NMP | NMP | | NMP | NMP |
| Current collector | Porous Ni-D | Porous Ni-D | Porous Ni-D | | Ni foil of 0.1 mm | Porous Ni-D |
| Thickness after being compressed | 0.3 mm | 0.2 mm | 0.3 mm | | Coating layer of 0.08 mm thick | 0.3 mm |
| Porosity | 35% | 8% | 35% | 35% | 20% | 35% |
| Size | 10 mm × 10 mm | 10 mm × 10 mm | 10 mm × 10 mm | Diameter: 12.5 mm | — | Diameter: 12.5 mm |
| Supported amount of carbon material | — | — | — | — | — | 30 mg/cm$^2$ |
| Connected to | | | | SUS304 cover | SUS304 cover | SUS304 cover |
| Electrical connection | Integral lead | Integral lead | Integral lead | Electric welding | Electric welding | Electric welding |
| Lithium ion occluding method | Electrochemical method | Electrochemical method | Electrochemical method | Nil | Chemical method | Chemical method |
| Lithium ion releasing capacity | 5.6 mAh | 4.2 mAh | 8.7 mAh | Nil | 3.5 mAh | 10.3 mAh |

When Examples 21 to 28 which are Working Examples of claim 6, are compared with Examples 29 to 31 as their Comparative Examples (here, Examples 31 is a Working Example of EDLC of the present invention, but it is at the same time a Comparative Example to EDLC of claim 6), it is evident that EDLC having the structure of claim 6 is distinctly superior in the capacity, the working voltage range, the internal resistance, the charge-discharge cycle durability and the energy density.

EDLC of the present invention has features such that a porous metal is used as the current collector, and a carbonaceous material having lithium ions preliminarily occluded by a chemical method and/or an electrochemical method to a carbon material capable of occluding and releasing lithium ions, is used for the negative electrode, whereby the working voltage is high, the capacity is large, and the internal resistance is small. As a result, it will be EDLC which is capable of rapid charging and releasing and excellent in the charge-discharge cycle durability and which has an energy density higher by at least twice than conventional EDLC.

Further, EDLC of the present invention is useful for a capacity of a relatively small size such as a coin-shaped capacity, but it is particularly suitable for EDLC with a super large capacity or for a large current application, whereby the electrostatic capacitance is from 100 to 10000 F, or the charging or discharging current is from 5 to 1000 A. EDLC of the present invention has a high working voltage, whereby a unit element will suffice for the purpose of a memory backup of 3 V. It will be able to remarkably improve the driving power performance of an electrical car which is expected to be developed for practical use, and the regenerative braking energy of e.g. an electric car can effectively be utilized. Therefore, its value for industrial application is significant.

What is claimed is:

1. An electric double layer capacitor comprising a positive electrode having a current collector combined with a polarizable electrode material composed mainly of activated carbon, a negative electrode having a current collector of porous metal incapable of forming an alloy with lithium, combined with a carbonaceous material having lithium ions occluded by a chemical method or an electrochemical method to a carbon material occluding and releasing lithium ions, and a nonaqueous electrolyte containing a lithium salt, wherein the negative electrode is prepared by having a mixture of a binder and a carbon material occluding and releasing lithium ions, supported on a current collector of porous metal having a porosity of more than 80%, followed by compressing the negative electrode to bring the thickness to a level of from 0.1 to 1 mm and the porosity to a level of from 5 to 80%.

2. The electric double layer capacitor according to claim 1, wherein the current collector for the negative electrode is porous nickel having a porosity of from 90 to 99%, wherein the average number of pores traversed by a linear line of a length of 1 cm drawn on the cross section of the current collector is at least 5.

3. The electric double layer capacitor according to claim 1, wherein the carbon material occluding and releasing lithium ions is a graphite material, a carbon material for high capacity or a carbon material which is easily graphitizable obtained by heat treatment of coal coke, petroleum coke or pitch coke, a baked product of a furfuryl alcohol resin, a baked product of a novolak resin or a baked product of a phenol resin.

4. The electric double layer capacitor according to claim 1, wherein the lattice spacing $d_{002}$ of the face as measured by the X-ray diffraction of the carbon material occluding and releasing lithium ions is from 0.365 to 0.390 nm.

5. The electric double layer capacitor according to claim 1, wherein the current collector for the positive electrode is made of a porous metal.

6. The electric double layer capacitor according to claim 5, wherein the positive electrode is the one prepared by having a polarizable electrode material comprising activated carbon having a specific surface area of from 1000 to 3000 $m^2/g$, electroconductive carbon black and a binder, supported on a current collector of porous metal having a porosity of more than 80%, followed by compressing to bring the thickness to a level of from 0.2 to 2.0 mm and the porosity to a level of from 10 to 80%.

7. The electric double layer capacitor according to claim 5, wherein the current collector for the positive electrode is made of porous aluminum or porous nickel having a porosity of from 80 to 99%, wherein the average number of pores traversed by a linear line of a length of 1 cm drawn on the cross section of the porous metal is at least 5.

8. The electric double layer capacitor according to claim 1, wherein the lithium salt is at least one member selected from the group consisting of $LiClO_4$, $LiBF_4$, $LiN(CF_3SO_2)_2$ and $LiPF_6$.

9. The electric double layer capacitor according to claim 1, wherein the solvent for the nonaqueous electrolyte is at least one member selected from the group consisting of propylene carbonate, ethylene carbonate, diethylcarbonate, dimethoxyethane, butylenecarbonate, dimethylcarbonate, sulfolane and ethyl methyl carbonate.

10. The electric double layer capacitor according to claim 1, wherein the positive electrode, the negative electrode and the nonaqueous electrolyte are accommodated in a coin-shaped container of metal comprising a casing and a cover, wherein the positive electrode is disposed on one side of the casing and the cover which are made of a stainless steel sheet and a laminated sheet of aluminum and stainless steel, and the negative electrode is disposed on the other of and the cover or the casing which are made of a stainless steel sheet, a nickel sheet, a copper sheet or a laminated sheet of at least two members selected from the group consisting of stainless steel, nickel and copper.

11. The electric double layer capacitor according to claim 1, wherein the ratio of bv/3.6 d is within a range of from 0.05 to 0.90, where b is the single electrode capacity (unit: F) of the polarizable positive electrode, d is the lithium ion releasing capacity (unit: mAh) of the negative electrode, and v is the potential difference (unit: V) in the working voltage range.

12. An electric double layer capacitor comprising:

a positive electrode having a current collector combined with a polarizable electrode material composed mainly of activated carbon, a negative electrode having a current collector of a porous metal having a porosity prior to compression of 80–99.5% and a porosity after compression of from 5 to 80% and a thickness after compression of from 0.1 to 1 mm, an average pore number of at least 5 and incapable of forming an alloy with lithium, combined with a carbonaceous material having lithium ions occluded, wherein said carbonaceous material having lithium ions occluded is obtained by a chemical method or an electrochemical method by occluding lithium ions to a carbon material selected from the group consisting of natural graphite; artificial graphite; graphitized meso-carbon microbeads; graphite whiskers; graphitized carbon fibers; gas phase grown carbon fibers; graphitizable materials obtained by heat treatment of a coke selected from the group consisting of coal coke, petroleum coke and pitch coke; a baked product of a furfuryl alcohol resin; a baked product of a phenol resin and a baked product of a novolak resin, wherein the carbon material occludes and releases lithium ions; and a nonaqueous electrolyte containing a lithium salt.

13. The electric double layer capacitor as claimed in claim 12, wherein the porous metal is a member selected from the group consisting of nickel, copper and alloys thereof.

* * * * *